United States Patent
Pathak et al.

(10) Patent No.: US 10,055,535 B2
(45) Date of Patent: Aug. 21, 2018

(54) METHOD, SYSTEM AND PROGRAM PRODUCT FOR IDENTIFYING ANOMALIES IN INTEGRATED CIRCUIT DESIGN LAYOUTS

(71) Applicant: GLOBALFOUNDRIES Inc., Grand Cayman (KY)

(72) Inventors: Piyush Pathak, Fremont, CA (US); Robert C. Pack, Morgan Hill, CA (US); Wei-Long Wang, Clifton Park, NY (US); Karthik Krishnamoorthy, San Jose, CA (US); Fadi S. Batarseh, Santa Clara, CA (US); Uwe Paul Schroeder, Santa Cruz, CA (US); Sriram Madhavan, Santa Clara, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 15/277,796

(22) Filed: Sep. 27, 2016

(65) Prior Publication Data

US 2018/0089357 A1   Mar. 29, 2018

(51) Int. Cl.
*G06F 17/50*   (2006.01)

(52) U.S. Cl.
CPC ...... *G06F 17/5081* (2013.01); *G06F 17/5036* (2013.01); *G06F 2217/12* (2013.01)

(58) Field of Classification Search
CPC .......................... G06F 17/5081; G06F 17/5036
USPC ....................................................... 716/112
See application file for complete search history.

(56) References Cited

U.S. PATENT DOCUMENTS

| | | | | |
|---|---|---|---|---|
| 7,185,012 | B1* | 2/2007 | Koudas | G06F 17/30498 |
| 9,846,934 | B2* | 12/2017 | Zafar | G06T 7/001 |
| 2012/0137367 | A1* | 5/2012 | Dupont | G06F 21/00 726/25 |
| 2012/0216169 | A1* | 8/2012 | Park | G01N 21/95607 716/136 |
| 2015/0058982 | A1* | 2/2015 | Eskin | H04L 63/1425 726/23 |
| 2016/0300338 | A1* | 10/2016 | Zafar | G06T 7/001 |

(Continued)

*Primary Examiner* — Suchin Parihar
(74) *Attorney, Agent, or Firm* — Heslin Rothenberg Farley and Mesiti PC; Nicholas Mesiti

(57) ABSTRACT

Disclosed is a method and corresponding system and program product that includes providing integrated circuit design layout(s), deconstructing the integrated circuit design layout(s) into unit-level geometric constructs, identifying anomalies in the unit-level geometric constructs, and storing anomaly data in a database. The method further includes determining one or more feature attributes for each of the plurality of unit-level geometric constructs, annotating the unit-level geometric constructs with feature attributes, resulting in annotated unit-level geometric constructs, mapping the annotated unit-level geometric constructs in a hyperplane formed by one or more feature attributes, each of the one or more feature attributes forming a dimensional axis of the hyperplane, resulting in a mapped hyperplane, applying a first model to the mapped hyperplane, identifying the anomalies from applying the first model, and applying a second model to the mapped hyperplane to rank the anomalies for printability risk, the generated data including rank data.

20 Claims, 8 Drawing Sheets

(56) References Cited

U.S. PATENT DOCUMENTS

2016/0378902 A1* 12/2016 Graur .................. G06F 17/5081
  716/52
2018/0033132 A1* 2/2018 Zafar ...................... G06T 7/001

* cited by examiner $$\frac{\sum bit_{ij}}{7} = \frac{7}{7} + \frac{4}{7} \longleftarrow \begin{array}{l} \text{"L3 0 0 0 0 2 0 /} \\ \text{0 2 2 0 2 0 /} \\ \text{4 6 6 4 6 4 /} \\ \text{0 2 2 0 2 0 /} \\ \text{0 0 2 0 2 0 /} \\ \text{4 4 \boxed{7} \boxed{4} 6 4 /} \\ \text{0 0 2 0 2 0 /} \\ \text{0 0 0 0 2 0"} \end{array}$$

METHOD, SYSTEM AND PROGRAM PRODUCT FOR IDENTIFYING ANOMALIES IN INTEGRATED CIRCUIT DESIGN LAYOUTS

BACKGROUND OF THE INVENTION

Technical Field

The present invention generally relates to integrated circuit design. More particularly, the present invention relates to improving yield by identifying anomalies in integrated circuit design layouts.

Background Information

Verification methods are widely used to detect manufacturability "hotspots" in physical integrated circuit design. "Hotspot" detection falls under a more general "anomaly detection" in design space with respect to manufacturability or printability. These methods include model-based optical rule checks (ORCs) for detecting lithographic hotspots on a wafer, pattern-matching based two-dimensional design rule checks for detecting a "known" yield limiting pattern from a foundry, rule-based manufacturability analysis and scoring where configurations are scored based on an approximate yield model.

SUMMARY OF THE INVENTION

The shortcomings of the prior art are overcome and additional advantages are provided through the provision, in one aspect, of a method of improving yield by identifying anomalies in integrated circuit design layouts. The method includes providing a data representation of at least one integrated circuit design layout and one or more input parameters to a memory in communication with a processor, deconstructing, by the processor according to instructions stored in the memory, the data representation into a plurality of unit-level geometric constructs, identifying, by the processor according to instructions stored in the memory, anomalies in the plurality of unit-level geometric constructs, the identifying being based on only the plurality of unit-level geometric constructs, storing, by the processor according to instructions stored in the memory, anomaly data in a database, the providing, the deconstructing, the identifying and the storing being performed prior to semiconductor manufacturing, and using the anomaly data to perform semiconductor manufacturing, the using improving semiconductor manufacturing yield as compared to not using the anomaly data.

System and program product aspects corresponding to the method are also presented.

Additional features and advantages of this invention will become apparent from the following detailed description of the various aspects of the invention taken in conjunction with the accompanying drawings.

BRIEF DESCRIPTION OF THE DRAWINGS

Thus, a need exists for ways to improve yield by culling design elements with potential patterning problems.

FIG. 7 is a top-down view of the unit-level geometric construct of FIGS. 2-6, and shows calculation of the bit density.

DETAILED DESCRIPTION OF THE INVENTION

Figure 1:
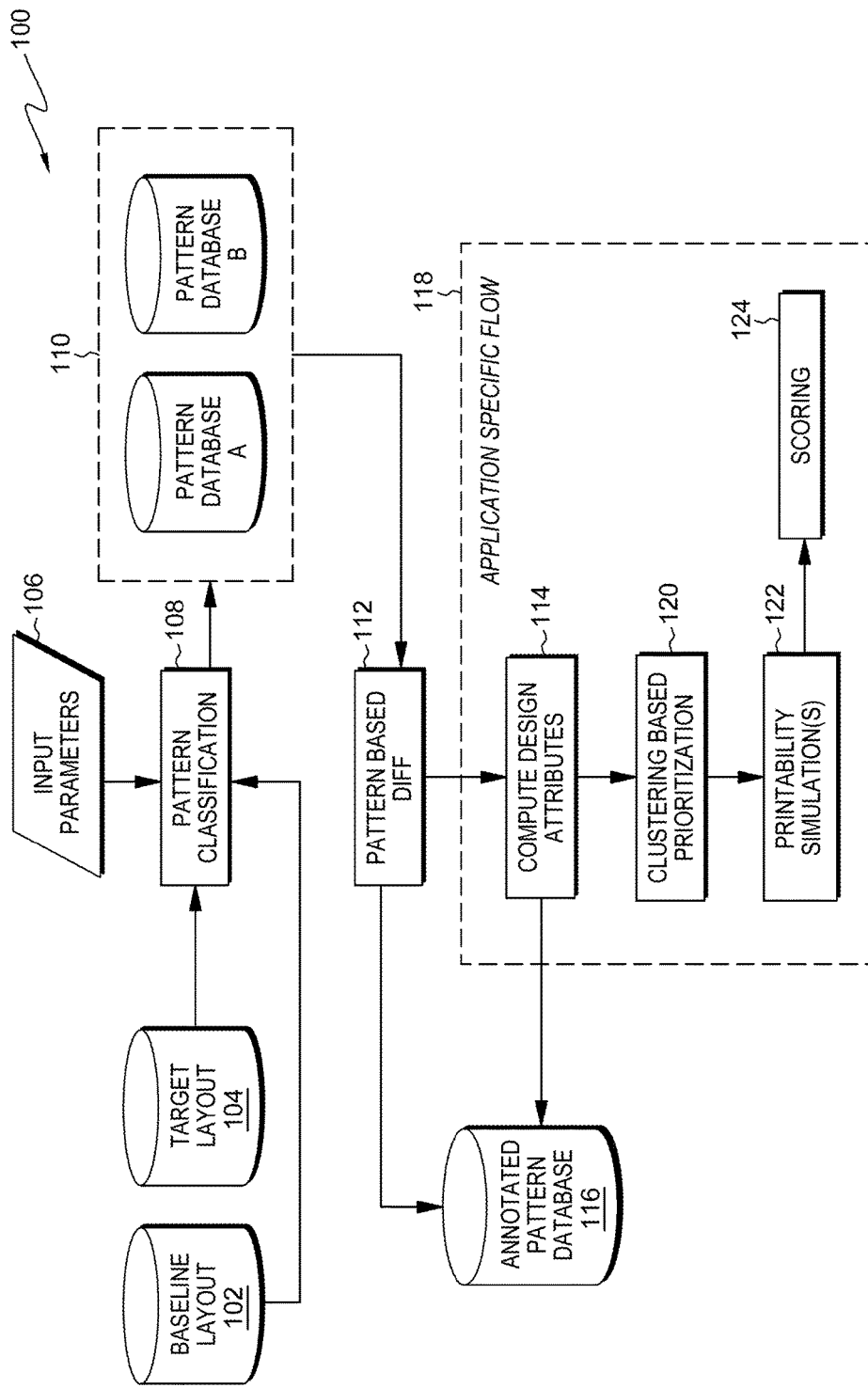
FIG. 1 is one example of a flow diagram for characterizing semiconductor circuit design layouts for further processing (e.g., ranking or scoring, filtering, etc.). A baseline layout, a target layout and one or more input parameters (e.g., pattern radius, IC design layers) are provided to a pattern classification (also known as deconstruction) module. The deconstruction module outputs unit-level geometric constructs to a database (e.g., a unified database), i.e., the deconstruction module populates the databases. A pattern-based anomaly detection module identifies possible anomalies in one or more of the unit-level geometric constructs. Feature attributes of the unit-level geometric construct(s) can be computed by a feature attribute computation module. The output of the feature attribute computation module in conjunction with the anomaly detection module may then be applied to generate an annotated pattern database for current or future processing.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

As used herein, the term "connected," when used to refer to two physical elements, means a direct correlation between the two physical elements. The term "coupled," however, can mean a direct connection or a connection through one or more intermediary elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As used herein, unless otherwise specified, the term "about" used with a value, such as measurement, size, etc., means a possible variation of plus or minus five percent of the value.

Reference is made below to the drawings, which are not drawn to scale for ease of understanding, wherein the same reference numbers are used throughout different figures to designate the same or similar components.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable storage medium(s) having computer readable program code embodied thereon.

Figure 10:
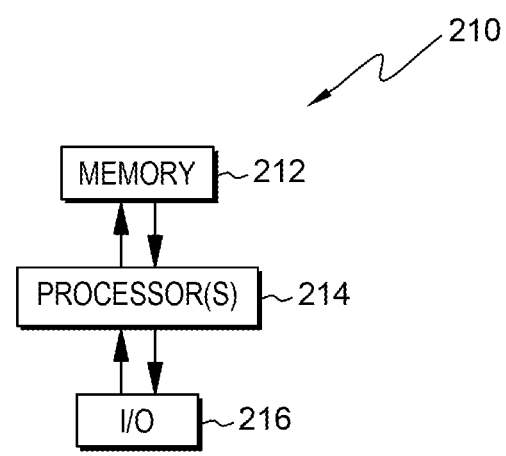
FIG. 10 is a simplified high-level block diagram of a computer system useful with the present invention. The system includes, for example, a memory storing program code logic, in communication with processor(s) to perform a method. Various input/output devices may be used to interact with the system.

FIG. 10 is a simplified high-level block diagram of a computer system 210 useful with the present invention. The system includes, for example, a memory 212 storing program code logic, in communication with processor(s) 214 to perform a method. Various input/output devices 216 may be used to interact with the system.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 9:
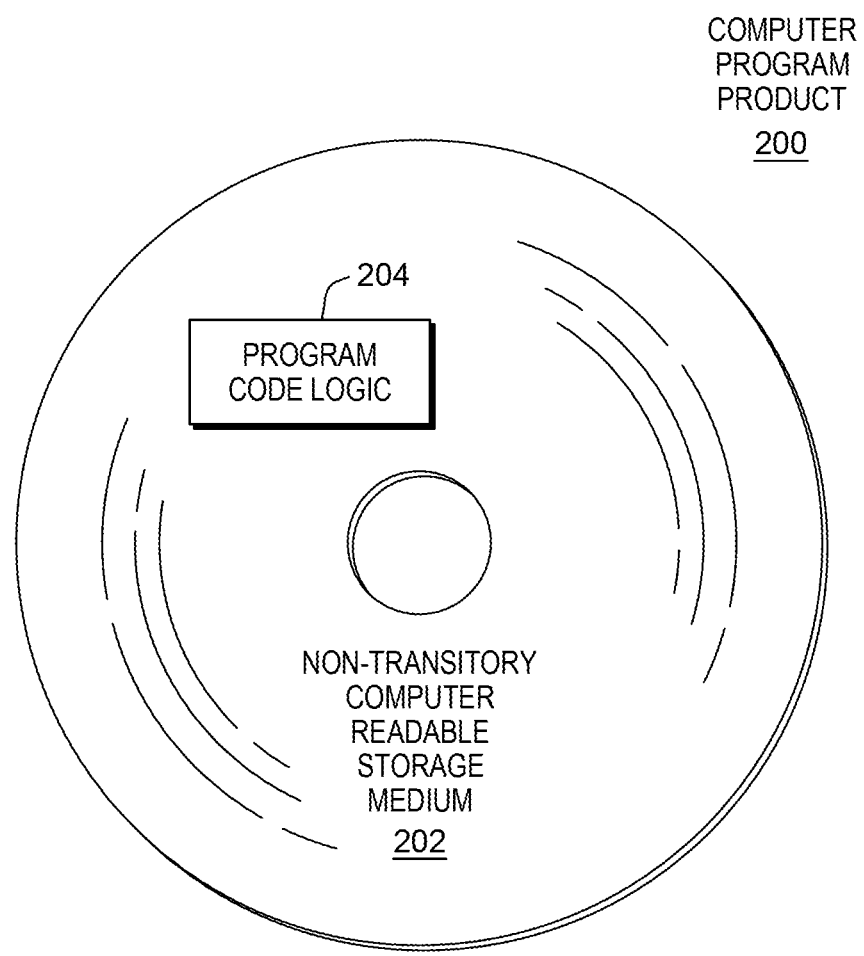
FIG. 9 depicts one example of a computer program product, including, for instance, one or more non-transitory computer readable storage media to store computer readable program code means or logic thereon to provide and facilitate one or more aspects of the present invention.

Referring now to FIG. 9, in one example, a computer program product 200 includes, for instance, one or more non-transitory computer readable storage media 202 to store computer readable program code means or logic 204 thereon to provide and facilitate one or more aspects of the present invention.

Program code embodied on a computer readable storage medium may be transmitted using an appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The corresponding structures, materials, acts, and equivalents of all means or step plus function elements in the claims below, if any, are intended to include any structure, material, or act for performing the function in combination with other claimed elements as specifically claimed. The description of one or more aspects of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

Anomaly detection in physical integrated circuit design with respect to manufacturability includes data representation with classification by deconstruction of a design layout database into unit-level geometric constructs, and feature encoding by annotating geometric constructs with feature attributes from a spatial and/or spectral domain. Anomaly detection may include, for example, clustering by mapping geometric constructs in a hyperplane represented by the feature dimensions, by criterion, i.e., the distance between geometric constructs in the hyperplane is inversely proportional to the degree of similarity between them, and the degree of similarity being measured in terms of either design and/or process. Finally, anomaly detection includes scoring by processing simulations to score design patterns with high scores implying high pattering yield and vice-versa.

FIG. 1 is one example of a flow diagram 100 for characterizing semiconductor circuit design layouts for further processing (e.g., ranking or scoring, filtering, etc.). A baseline layout 102, a target layout 104 and one or more input parameters 106 (e.g., pattern radius, IC design layers, etc.) are provided to pattern classification (also known as deconstruction) module 108. The deconstruction module outputs unit-level geometric constructs to database 110 (e.g., a unified database), i.e., the deconstruction module populates the databases. A pattern-based anomaly detection module identifies possible anomalies in one or more of the unit-level geometric constructs. Feature attributes of the unit-level geometric construct(s) can be computed by feature attribute module 114. The output of the feature attribute module and the identified anomalies may then be provided to annotated pattern database 116 for current or future processing.

In one example, the current/future processing may include scoring and ranking anomalies for risk of patterning errors. For example, FIG. 1 also shows one example of an optional application flow 118. After the feature attributes are computed, the data may then be clustered into groups (and outliers selected) for prioritization 120, after which printability simulation(s) 122 lead to scoring 124. Clusters framed in the hyper plane formed by the feature attributes of unit-level geometric constructs are identified using Euclidean-distance-metrics-based local neighborhood density computations.

The following is only one example set of design features chosen in this study. In this example, the set of design features include a count of critical dimensions, a via count and a bit density. Other smaller or larger sets of features spanning spatial and/or spectral domains could instead be selected based on the intended end-application and prior knowledge-base.

Figure 2:
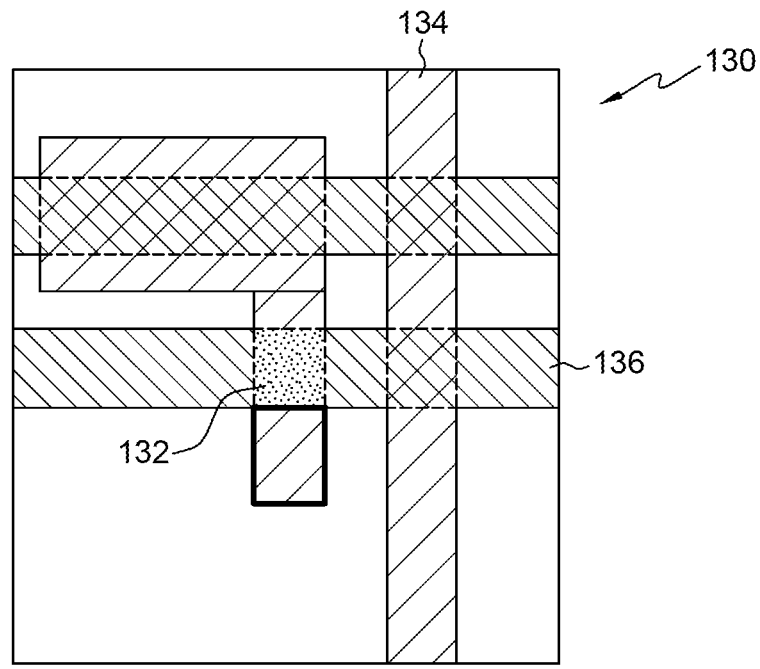
FIG. 2 is a top-down view of one example of a simplified unit-level geometric construct (ULGC) for an enclosure rule of "via to metal below," the ULGC including a via sandwiched between a bottom metal layer and a top metal layer.

FIG. 2 is a top-down view of one example of a simplified unit-level geometric construct (ULGC) 130, the ULGC including a via 132 sandwiched between a bottom metal layer 134 and a top metal layer 136. Also shown is area 133, which is the location of a via-to-metal-below enclosure rule.

The count of critical dimensions (CCD) is defined by rules. In the present example, a CCD is a count of how many places in a given unit-level geometric construct there is, on three levels in this example, a via sandwiched by top and bottom metal layers. This rule is only satisfied once in the unit-level geometric construct of FIG. 2. Note that the higher the CCD, the higher the bit density of the pattern.

Figure 7:
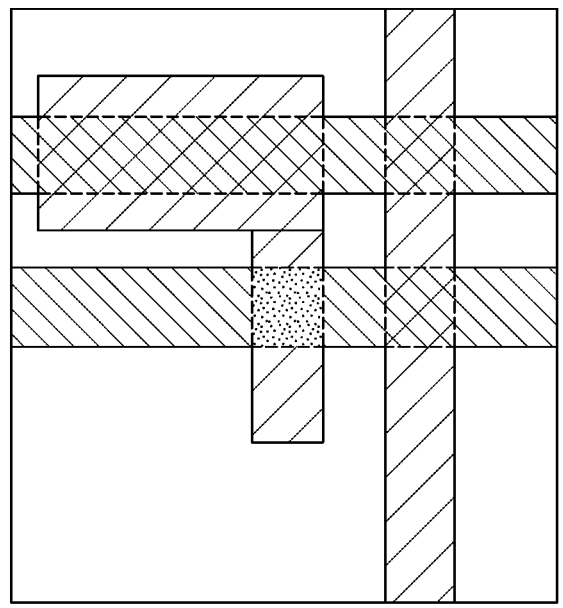
As shown in FIG. 7, the bit value 0 represents space, 1 represents via only, 2 represents metal below only, 3 represents geometry where via and metal below overlaps (1+2), 4 represents metal above only, 5 represents geometry where via and metal above overlaps (1+4), 6 represents geometry where metal above and metal below overlap (2+4), and 7 represents where via, metal below and metal above overlap (1+2+4), based on bit values for each layer mentioned above.

In FIG. 2, the space (where no layer geometry is present) can be represented by the bit value 0, via layer geometry can be represented by the bit value $2^0=1$, bottom metal layer can be represented by the bit value $2^1=2$, and metal above layer can be represented by the bit value $2^2=4$. In general, the $n^{th}$ layer geometry can be represented by the bit value $2^{n-1}$. This results in the bit signature representation of the ULGC. As shown in FIG. 7, the bit value 0 represents space, 1 represents via only, 2 represents metal below only, 3 represents geometry where via and metal below overlaps (1+2), 4 represents metal above only, 5 represents geometry where via and metal above overlaps (1+4), 6 represents geometry where metal above and metal below overlaps (2+4), and 7 represents where via, metal below and metal above overlaps (1+2+4), based on bit values for each layer mentioned above.

Figure 3:
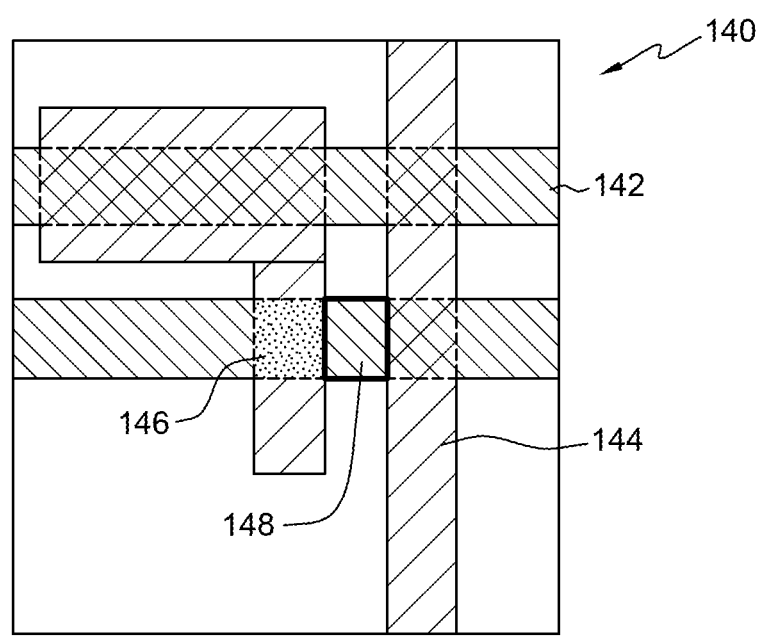
FIG. 3 depicts a top-down view of a second example of a unit-level geometric construct with a layout the same as the example of FIG. 2. The ULGC has three levels: top metal layer, bottom metal layer and a via layer in between the top and bottom metal layers.

FIG. 3 depicts a top-down view of a second example of a unit-level geometric construct 140 with a layout the same as the example of FIG. 2, but with an additional rule(s). The ULGC has three levels: top metal layer 142, bottom metal layer 144 and a via layer 146 in between the top and bottom metal layers. In this example, the rules (i.e., what to look for) include a via sandwiched between top and bottom metal layers (in this case, only one area (146) satisfies), and an open (unfilled) via space above the bottom metal layer. In this example, only area 148 satisfies the second rule. Thus, the CCD=1+1=2.

Figure 4:
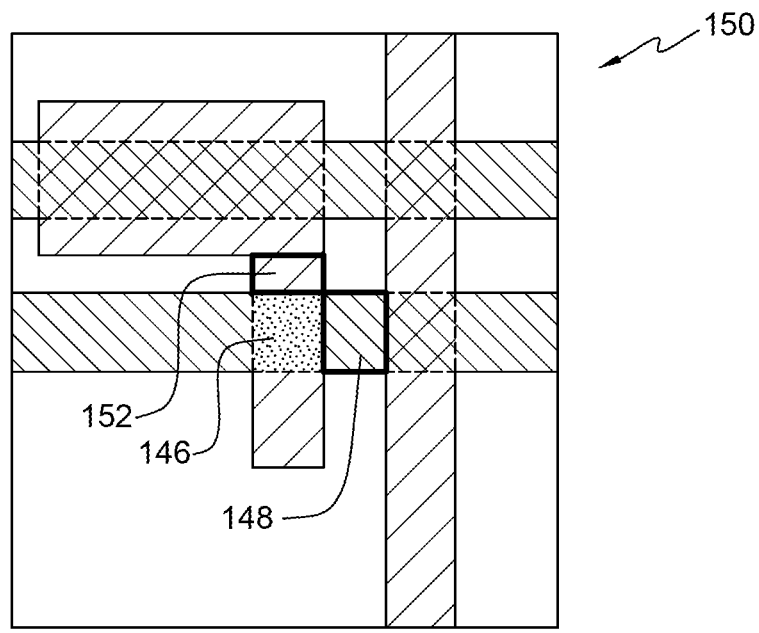
FIG. 4 depicts a top-down view of a third example of a unit-level geometric construct (same layout, additional rule(s)) with the same rules as the second example of FIG. 3 plus a via-to-metal-corner rule. There is only one location in the unit-level geometric construct meeting each of the rules, those of FIG. 3 and a location meeting the via-to-metal-corner rule. Thus, the count of critical dimensions (CCD) are computed as feature attributes of ULGC, and the CCD value for this example is 2+1=3. The space (where no layer geometry is present) can be represented by the bit value 0, via layer geometry can be represented by the bit value $2^{0}=1$, bottom metal layer can be represented by the bit value $2^{1}=2$, and metal above layer can be represented by the bit value $2^{2}=4$. In general, the $n^{th}$ layer geometry can be represented by the bit value $2^{n-1}$. This results in the bit signature representation of the ULGC.

FIG. 4 depicts a top-down view of a third example of a unit-level geometric construct 150 (same layout, additional rule(s)) with the same rules as the second example of FIG. 3 plus a via-to-metal-corner rule. This rule says that if a via is within a specified distance range from the metal-corner, then this rule is invoked. There is only one location in the unit-level geometric construct meeting each of the rules, those of FIG. 3 and location 152 meeting the via-to-metal-corner rule. Thus, the CCD for this example is 2+1=3. The bottom metal layer can be represented.

Figure 5:
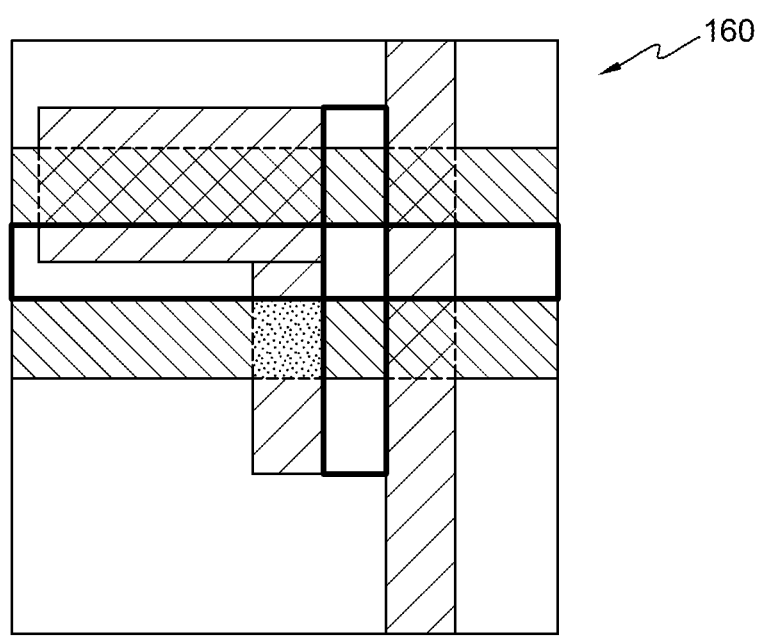
FIG. 5 depicts a top-down view of a fourth example of a unit-level geometric construct (again, same layout, additional rules) with the same rules as the third example of FIG. 4 plus one more rule: a metal above to metal above and metal below to metal below space rule that satisfy this fourth rule. Thus, the CCD of this example is 3+2=5.

FIG. 5 depicts a top-down view of a fourth example of a unit-level geometric construct 160 (again, same layout, additional rule(s)) with the same rules as the third example of FIG. 4 plus one more rule: a metal space 162 and 164 that satisfy this fourth rule. Thus, the CCD of this example is 3+2=5.

Figure 6:
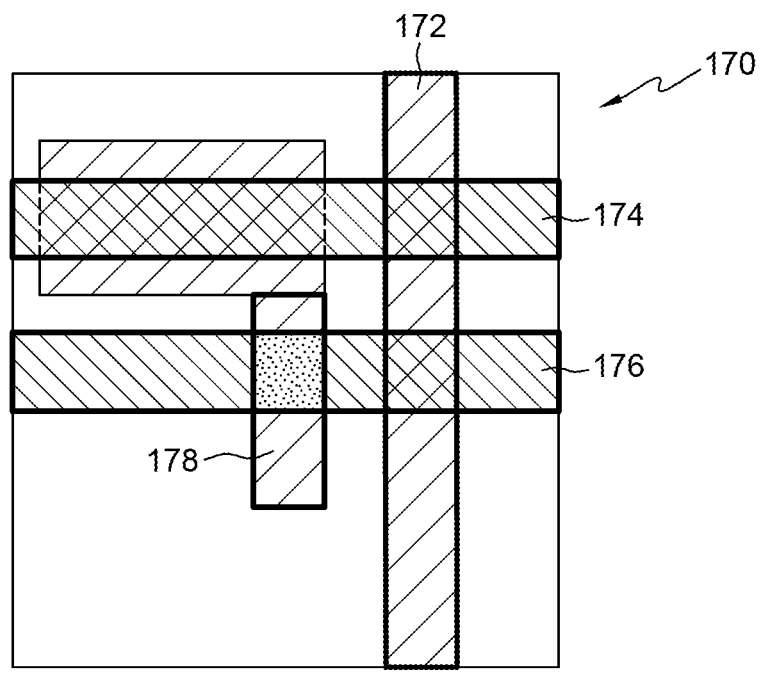
FIG. 6 depicts a top-down view of a fifth and final example of a ULGC (same layout, additional rule(s)) with the same rules as the fourth example of FIG. 5 plus a metal width rule. There are four locations in the ULGC that satisfy this fifth rule: locations. Thus, the CCD for this example is 5+4=9.

FIG. 6 depicts a top-down view of a fifth and final example of a ULGC 170 (same layout, additional rule(s)) with the same rules as the fourth example of FIG. 5 plus a metal width. There are four locations in the ULGC that satisfy this fifth rule: locations 172, 174, 176 and 178. Thus, the CCD for this example is 5+4=9.

With reference to FIG. 7, which includes a top-down view of the unit-level geometric construct 179 of FIGS. 2-6, the bit density can be calculated according to the following:

$$\frac{\sum \text{bit}ij}{X};$$

where "i" is the row index of the bit pattern representation of ULGC, "j" is the column index of the bit pattern representation of ULGC and "X" is a maximum of bit value of the n-layer pattern as in this case, n=3 which implies the value of $X=2^0+2^1+2^2=7$. In general, $X=\Sigma_0^{n-1} 2^i$ for n-layer pattern.

Figure 8:
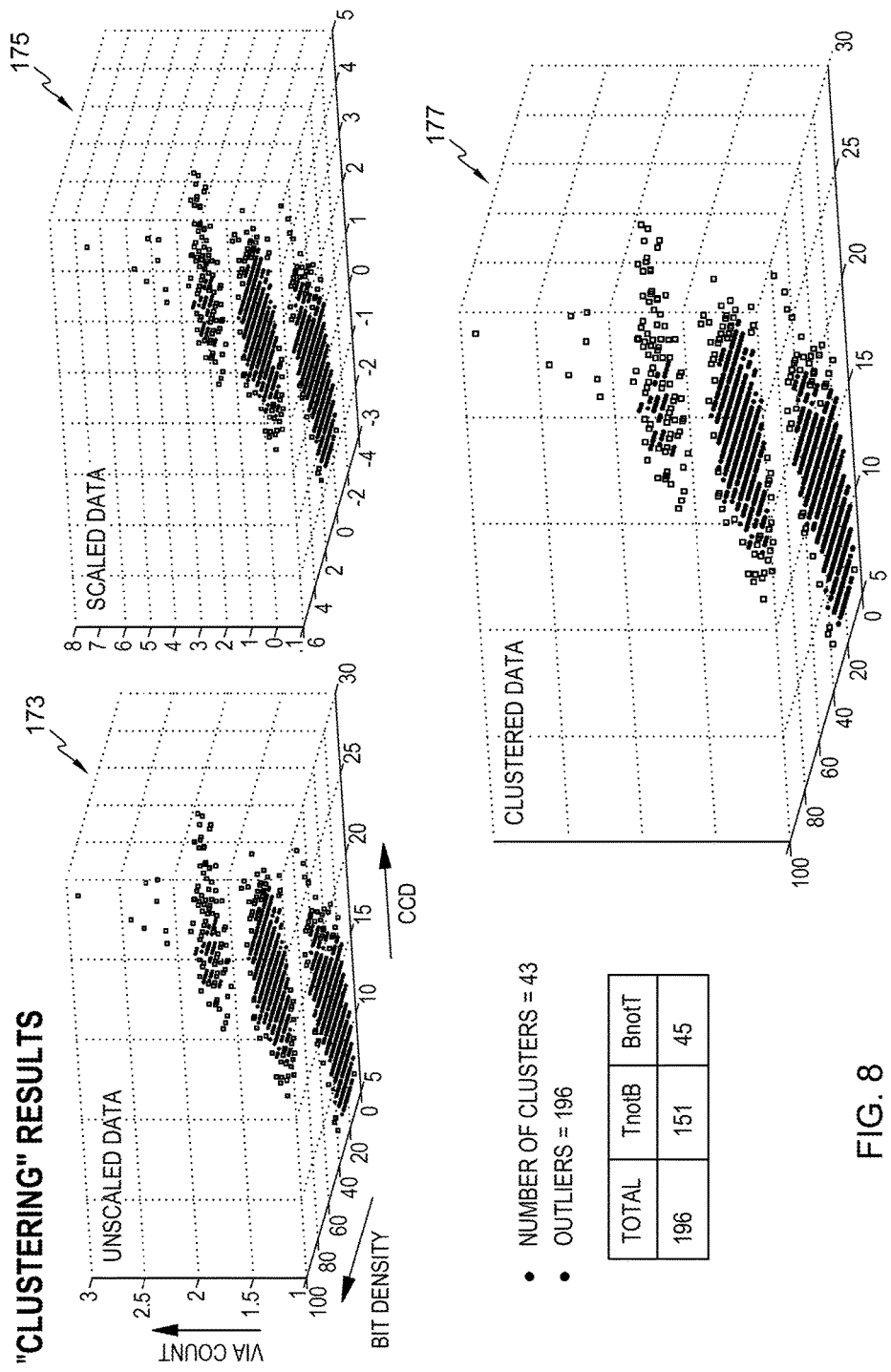
FIG. 8 depicts one way to accomplish ranking for risk of patterning issues using "clustering" of the data. In this example, the raw (or unscaled) data can be represented in three dimensions (X, Y, Z), with CCD along the X axis, bit density along the Y axis and via count on the Z axis, i.e., the three feature attributes used in the examples above. The data may then be scaled, and, lastly, the data can be clustered to identify clusters, along with outlier data to be left out.

With reference to FIG. 8, one way to accomplish ranking for risk of patterning issues (leading to lower yield) is the use of "clustering" of the data. Here, the data refers to the feature encoding of the patterns as computed by the feature attribute module. In this example, the raw (or unscaled) data 173 can be represented in three dimensions (X, Y, Z), with CCD along the X axis, bit density along the Y axis and via count on the Z axis, i.e., the three feature attributes used in the examples above. The data may then be scaled 175, and, lastly, the data can be clustered 177 to identify clusters, along with outlier data to be left out.

In a first aspect, disclosed above is a method. The method includes providing integrated circuit design layout(s), deconstructing the integrated circuit design layout(s) into unit-level geometric constructs, identifying anomalies in the unit-level geometric constructs, and storing anomaly data in a database.

In one example, the identifying in the method of the first aspect may include, for example, determining feature attribute(s) for each of the unit-level geometric constructs, and annotating the unit-level geometric constructs with feature attributes, resulting in annotated unit-level geometric constructs.

In one example, the method may further include, for example, mapping the annotated unit-level geometric constructs in a hyperplane formed by feature attribute(s), each of the feature attribute(s) forming a dimensional axis of the hyperplane, resulting in a mapped hyperplane. In one example, the method may further include, for example, applying a first model to the mapped hyperplane, and identifying the anomalies from applying the first model. In one example, the first model may include, for example, filtering model(s) and/or an anomaly-detection model.

In one example, where the first model is used, the method may further include, for example, applying a second model to the mapped hyperplane to rank the anomalies for patterning risk, the generated data including rank data. In one example, the second model may include, for example, process-based simulation(s) and/or a scoring model.

In one example, applying the second model may further include, for example, validating the anomalies.

In a second aspect, disclosed above is a system. The system includes a memory, and processor(s) in communication with the memory to perform a method. The method includes providing integrated circuit design layout(s), deconstructing the integrated circuit design layout(s) into unit-level geometric constructs, identifying anomalies in the unit-level geometric constructs, and storing anomaly data in a database.

In one example, the identifying may include, for example, determining feature attribute(s) for each of the unit-level geometric constructs and annotating the unit-level geometric constructs with feature attributes, resulting in annotated unit-level geometric constructs. In one example, the system may further include, for example, mapping the annotated unit-level geometric constructs in a hyperplane formed by feature attribute(s), each of the feature attribute(s) forming a dimensional axis of the hyperplane, resulting in a mapped hyperplane. In one example, the system may further include, for example, applying a first model to the mapped hyperplane, and identifying the anomalies from applying the first model. In one example, the first model may include, for example, filtering model(s) and/or an anomaly-detection model, and applying a second model to the mapped hyperplane to rank the anomalies for patterning risk, the generated data including rank data. In one example, the second model may include, for example, process-based simulation(s) and/or a scoring model, and applying the second model may further include, for example, validating the anomalies.

In a third aspect, disclosed above is a computer program product. The computer program product includes a non-transitory storage medium readable by a processor and storing instructions for execution by the processor for performing a method. The method includes providing integrated circuit design layout(s), deconstructing the integrated circuit design layout(s) into unit-level geometric constructs, identifying anomalies in the unit-level geometric constructs, and storing anomaly data in a database.

In one example, the identifying may include, for example, determining feature attribute(s) for each of the unit-level geometric constructs, and annotating the unit-level geometric constructs with feature attributes, resulting in annotated unit-level geometric constructs. In one example, the method may further include, for example, mapping the annotated unit-level geometric constructs in a hyperplane formed by feature attribute(s), each of the feature attribute(s) forming a dimensional axis of the hyperplane, resulting in a mapped hyperplane. In one example, the method may further include, for example, applying a first model to the mapped hyperplane, and identifying the anomalies from applying the first model. In one example, the first model may include, for example, filtering model(s) and/or an anomaly-detection model, and applying a second model to the mapped hyperplane to rank the anomalies for patterning risk, the generated data including rank data. In one example, the second model may include, for example, process-based simulation(s) and/or a scoring model, and applying the second model may further include, for example, validating the anomalies.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method, comprising:
providing a data representation of at least one integrated circuit design layout and one or more input parameters to a memory in communication with a processor;
deconstructing, by the processor according to instructions stored in the memory, the data representation into a plurality of unit-level geometric constructs;
identifying, by the processor according to instructions stored in the memory, anomalies in the plurality of unit-level geometric constructs, wherein the identifying is based on only the plurality of unit-level geometric constructs;
storing, by the processor according to instructions stored in the memory, anomaly data in a database, wherein the providing, the deconstructing, the identifying and the storing are performed prior to semiconductor manufacturing; and
using the anomaly data to perform semiconductor manufacturing, the using improving semiconductor manufacturing yield as compared to not using the anomaly data.

2. The method of claim 1, wherein the identifying comprises:
determining, by the processor according to instructions stored in the memory, one or more feature attributes for each of the plurality of unit-level geometric constructs; and
annotating, by the processor according to instructions stored in the memory, the unit-level geometric constructs with feature attributes, resulting in annotated unit-level geometric constructs.

3. The method of claim 2, further comprising mapping, by the processor according to instructions stored in the memory, the annotated unit-level geometric constructs in a hyperplane formed by one or more feature attributes, each of the one or more feature attributes forming a dimensional axis of the hyperplane, resulting in a mapped hyperplane.

4. The method of claim 3, further comprising:
applying, by the processor according to instructions stored in the memory, a first model to the mapped hyperplane; and
identifying, by the processor according to instructions stored in the memory, the anomalies from applying the first model.

5. The method of claim 4, wherein the first model comprises at least one of a filtering model and an anomaly-detection model.

6. The method of claim 4, further comprising applying, by the processor according to instructions stored in the memory, a second model to the mapped hyperplane to rank the anomalies for patterning risk, wherein an outcome of applying the second model comprises rank data.

7. The method of claim 6, wherein the second model comprises at least one of a process-based simulation and a scoring model.

8. The method of claim 6, wherein applying the second model further comprises validating, by the processor according to instructions stored in the memory, the anomalies.

9. A system, comprising:
a memory; and
at least one processor in communication with the memory, the memory storing instructions to perform a method, the method comprising:
providing, by the at least one processor according to the instructions, a data representation of at least one integrated circuit design layout;
deconstructing, by the at least one processor according to the instructions, the data representation into a plurality of unit-level geometric constructs;
identifying, by the at least one processor according to the instructions, anomalies in the plurality of unit-level geometric constructs, wherein the identifying is based on only the plurality of unit-level geometric constructs;
storing, by the at least one processor according to the instructions, anomaly data in a database, wherein the providing, the deconstructing, the identifying and the storing are performed prior to semiconductor manufacturing; and
using the anomaly data to perform semiconductor manufacturing, the using improving semiconductor manufacturing yield as compared to not using the anomaly data.

10. The system of claim 9, wherein the identifying comprises:
determining, by the at least one processor according to the instructions, one or more feature attributes for each of the plurality of unit-level geometric constructs; and
annotating, by the at least one processor according to the instructions, the unit-level geometric constructs with feature attributes, resulting in annotated unit-level geometric constructs.

11. The system of claim 10, further comprising mapping, by the at least one processor according to the instructions, the annotated unit-level geometric constructs in a hyperplane formed by one or more feature attributes, each of the one or more feature attributes forming a dimensional axis of the hyperplane, resulting in a mapped hyperplane.

12. The system of claim 11, further comprising:
applying, by the at least one processor according to the instructions, a first model to the mapped hyperplane; and
identifying, by the at least one processor according to the instructions, the anomalies from applying the first model.

13. The system of claim 12, wherein the first model comprises at least one of a filtering model and an anomaly-detection model, and wherein the method further comprises applying, by the at least one processor according to the instructions, a second model to the mapped hyperplane to rank the anomalies for patterning risk, wherein the generated data comprises rank data.

14. The system of claim 13, wherein the second model comprises at least one of a process-based simulation and a scoring model, and wherein applying the second model further comprises validating, by the at least one processor according to the instructions, the anomalies.

15. A computer program product, comprising:
a non-transitory storage medium readable by a processor and storing instructions for execution by the processor for performing a method, the method comprising:
providing a data representation of at least one integrated circuit design layout and one or more input parameters to a memory in communication with the processor;
deconstructing, by the processor according to the instructions, the data representation into a plurality of unit-level geometric constructs;
identifying, by the processor according to the instructions, anomalies in the plurality of unit-level geometric constructs, wherein the identifying is based on only the plurality of unit-level geometric constructs;
storing, by the processor according to the instructions, anomaly data in a database, wherein the providing, the deconstructing, the identifying and the storing are performed prior to semiconductor manufacturing; and
using the anomaly data to perform semiconductor manufacturing, the using improving semiconductor manufacturing yield as compared to not using the anomaly data.

16. The computer program product of claim 15, wherein the identifying comprises:
determining, by the processor according to the instructions, one or more feature attributes for each of the plurality of unit-level geometric constructs; and
annotating, by the processor according to the instructions, the unit-level geometric constructs with feature attributes, resulting in annotated unit-level geometric constructs.

17. The computer program product of claim 16, further comprising mapping, by the processor according to the instructions, the annotated unit-level geometric constructs in a hyperplane formed by one or more feature attributes, each of the one or more feature attributes forming a dimensional axis of the hyperplane, the mapping resulting in a mapped hyperplane.

18. The computer program product of claim 17, further comprising:
applying, by the processor according to the instructions, a first model to the mapped hyperplane; and
identifying, by the processor according to the instructions, the anomalies from applying the first model.

19. The computer program product of claim 18, wherein the first model comprises at least one of a filtering model and an anomaly-detection model, and wherein the method further comprises applying, by the processor according to the instructions, a second model to the mapped hyperplane to rank the anomalies for printability risk, wherein an outcome of applying the second model comprises rank data.

20. The computer program product of claim 19, wherein the second model comprises at least one of a process-based simulation and a scoring model, and wherein applying the second model further comprises validating, by the processor according to the instructions, the anomalies.

\* \* \* \* \*